US008337064B2

(12) United States Patent
Yonezawa

(10) Patent No.: US 8,337,064 B2
(45) Date of Patent: Dec. 25, 2012

(54) LAMP MOUNTING STRUCTURE AND VEHICLE TO WHICH LAMP IS MOUNTED WITH THE USE OF THE SAME

(75) Inventor: Seiho Yonezawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 391 days.

(21) Appl. No.: 12/679,428

(22) PCT Filed: Sep. 18, 2008

(86) PCT No.: PCT/IB2008/002435
§ 371 (c)(1),
(2), (4) Date: Mar. 22, 2010

(87) PCT Pub. No.: WO2009/040622
PCT Pub. Date: Apr. 2, 2009

(65) Prior Publication Data
US 2010/0214801 A1 Aug. 26, 2010

(30) Foreign Application Priority Data
Sep. 26, 2007 (JP) ................................. 2007-249244

(51) Int. Cl.
*F21V 7/04* (2006.01)
(52) U.S. Cl. .................... 362/549; 362/487; 362/548
(58) Field of Classification Search .................. 362/459, 362/487, 546, 548, 549
See application file for complete search history.

(56) References Cited

U.S. PATENT DOCUMENTS

| 6,471,386 | B2* | 10/2002 | Oh | 362/549 |
|---|---|---|---|---|
| 6,502,974 | B2* | 1/2003 | Chase et al. | 362/549 |
| 6,951,365 | B2* | 10/2005 | Chase et al. | 296/187.03 |
| 7,004,608 | B2* | 2/2006 | Goller | 362/546 |
| 7,029,154 | B2* | 4/2006 | Arlon et al. | 362/507 |
| 7,156,545 | B2* | 1/2007 | Arlon | 362/549 |
| 7,175,325 | B2* | 2/2007 | Otani et al. | 362/549 |
| 7,188,980 | B2* | 3/2007 | Ase et al. | 362/476 |
| 7,360,933 | B2* | 4/2008 | Kim | 362/505 |

(Continued)

FOREIGN PATENT DOCUMENTS
EP 1 127 739 A2 8/2001
(Continued)

OTHER PUBLICATIONS

Aug. 18, 2009 Office Action issued in Japanese Patent Application No. 2007-249244 (with translation).

(Continued)

*Primary Examiner* — Bumsuk Won
(74) *Attorney, Agent, or Firm* — Oliff & Berridge, PLC

(57) ABSTRACT

A weak portion (connection release device) is provided in an upper connection portion in which a headlamp, which is a lamp, is connected to a radiator support, which is a vehicle body, and therefore, when an impact load is applied from above a vehicle, an upper portion of the headlamp is detached from the radiator support. In a lower connection portion in which a lower portion of the headlamp is connected to a bumper reinforcement, which is a vehicle body, a lower connection device maintains a connection between the lower portion of the headlamp and the bumper reinforcement. When the impact load is applied in a longitudinal direction of the vehicle, the lower connection device releases the connection between the headlamp and the bumper reinforcement.

8 Claims, 11 Drawing Sheets

U.S. PATENT DOCUMENTS

| | | | |
|---|---|---|---|
| 7,404,688 B2 * | 7/2008 | Schwab | 403/329 |
| 7,419,291 B2 * | 9/2008 | Arlon | 362/549 |
| 7,967,488 B2 * | 6/2011 | Bae | 362/549 |
| 2005/0190573 A1 | 9/2005 | Schwab | |
| 2006/0146556 A1 | 7/2006 | Arlon et al. | |

FOREIGN PATENT DOCUMENTS

| | | |
|---|---|---|
| EP | 1 577 160 A1 | 9/2005 |
| EP | 1 702 794 A1 | 9/2006 |
| FR | 2 901 202 | 11/2007 |
| JP | U-4-11149 | 1/1992 |
| JP | U-5-3051 | 1/1993 |
| JP | A-2001-225708 | 8/2001 |
| JP | A-2004-203288 | 7/2004 |
| JP | A-2004-237795 | 8/2004 |
| JP | A-2004-338510 | 12/2004 |
| JP | A-2005-219545 | 8/2005 |

OTHER PUBLICATIONS

Nov. 10, 2009 Office Action issued in Japanese Patent Application No. 2007-249244 (with translation).

Journal of Technical Disclosure No. 2003-504453, Jul. 31, 2003, pp. 1-3, Japanese Institute of Invention and Innovation.

International Search Report and Written Opinion for International Application No. PCT/IB2008/002435, mailed on Jan. 30, 2009.

International Preliminary Report on Patentability for International Application No. PCT/IB2008/002435, mailed on Dec. 28, 2009.

* cited by examiner

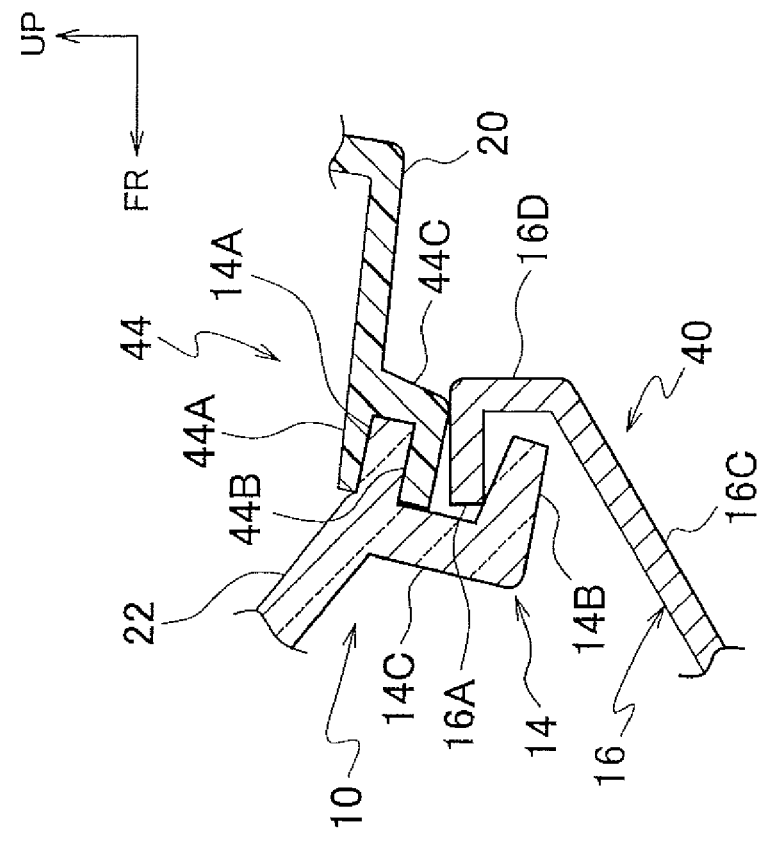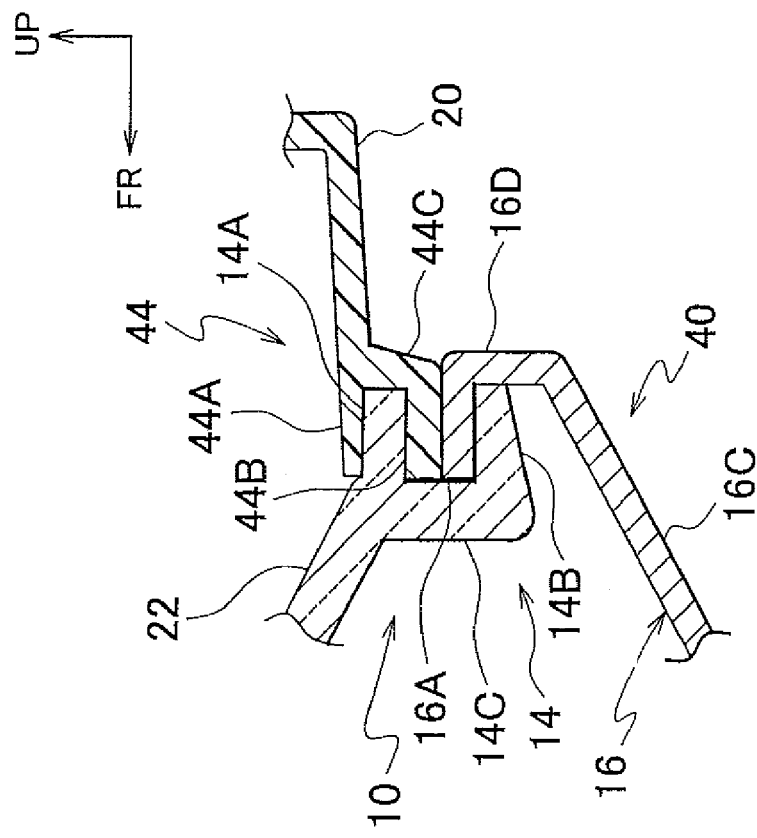

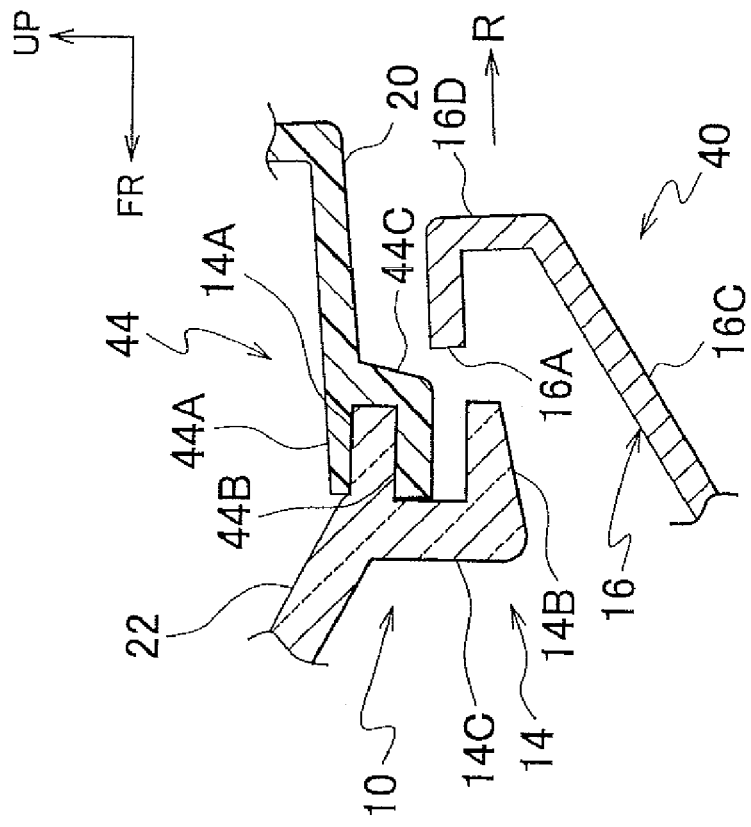
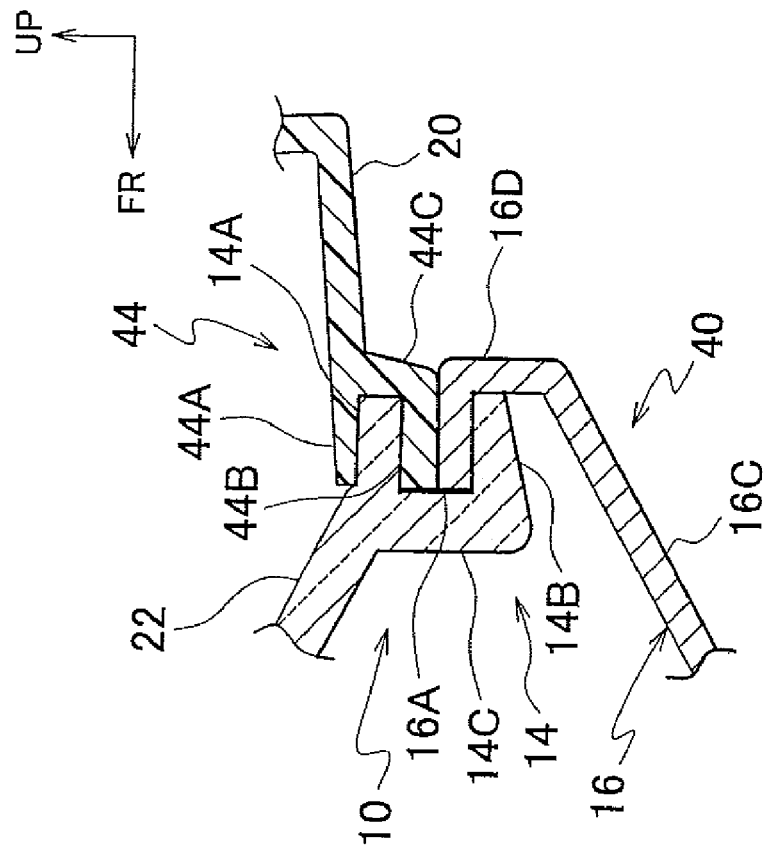

LAMP MOUNTING STRUCTURE AND VEHICLE TO WHICH LAMP IS MOUNTED WITH THE USE OF THE SAME

BACKGROUND OF THE INVENTION

1. Field of the Invention

The invention relates to a lamp mounting structure and a vehicle to which a lamp is mounted with the use of the lamp mounting structure.

2. Description of the Related Art

A structure in which a rear upper portion of a vehicle headlamp is fixed to a vehicle body through a separate bracket has been available (refer to Japanese Patent Application Publication No. 2004-203288 (JP-A-2004-203288)). In this structure, the separate bracket is divided into a portion on the vehicle body side and a portion on the headlamp side in response to an impact applied from above a vehicle so as to pivot and displace the headlamp about the position at which a front lower portion of the headlamp is attached, so that the impulse is moderated.

However, according to the related art described in JP-A-2004-203288, the front lower portion of the headlamp is fixed, by means of a bolt and a nut, to a headlamp stay that protrudes from a radiator core support side, and therefore, when a frontal impact occurs, an impact load applied from a front side of the vehicle is easily transmitted from the headlamp stay to the headlamp.

SUMMARY OF THE INVENTION

The invention provides a lamp mounting structure with which it is possible to minimize the influence on the lamp exerted when the impact load is applied in a longitudinal direction of the vehicle while securing the performance of absorbing impact energy when an impact load is applied from above the vehicle. The invention also provides a vehicle to which a lamp is mounted with the use of the lamp mounting structure.

A first aspect of the invention relates to a lamp mounting structure, with the use of which a lamp is mounted to an end portion of a vehicle in a longitudinal direction thereof. The lamp mounting structure includes a connection release means for detaching the lamp from a vehicle body in response to an impact load applied from above the vehicle. The connection release means is provided in an upper connection portion in which an upper portion of the lamp is connected to the vehicle body. The lamp mounting structure also includes a lower connection means for maintaining the connection between the lamp and the vehicle body when the impact load is applied from above the vehicle and releasing the connection between the lamp and the vehicle body in response to an impact load applied in the longitudinal direction of the vehicle. The lower connection means is provided in a lower connection portion in which the vehicle body is connected to a lower portion of the lamp on a side opposite to the center of the vehicle with respect to a center of gravity of the lamp in the longitudinal direction of the vehicle.

In the lamp mounting structure according to the first aspect of the invention, the connection release means is provided in the upper connection portion in which the lamp is connected to the vehicle body. Therefore, when the impact load is applied from above the vehicle, the upper portion of the lamp is detached from the vehicle body. On the other hand, the lower connection means for maintaining the connection between the lamp and the vehicle body is provided in the lower connection portion in which the lower portion of the lamp is connected to the vehicle body. Therefore, even when the impact load is applied from above the vehicle, the connection between the lower portion of the lamp and the vehicle body is maintained by the lower connection means. Further, the center of gravity of the lamp is positioned on the side closer to the center of the vehicle in the longitudinal direction of the vehicle with respect to the lower connection portion, and therefore, when the upper portion of the lamp is detached from the vehicle body, the lamp is pivoted about the lower connection portion and displaced downward with respect to the vehicle. This makes it possible to maintain the performance of absorbing the impact energy when the impact load is applied from above the vehicle.

Further, when the impact load is applied in the longitudinal direction of the vehicle, the lower connection means releases the connection between the lamp and the vehicle body. Therefore, the impact load is less likely to be transmitted from the vehicle body to the lamp. In other words, in the lamp mounting structure according to the first aspect, it is possible to minimize the influence on the lamp exerted when the impact load is applied in the longitudinal direction of the vehicle.

Further, the connection release means may be configured as a pair of notches provided in both sides, in a width direction of the vehicle, of the lamp upper stay that connects between the upper portion of the lamp and the vehicle.

In this configuration, the pair of notches function as a weak portion, and therefore it is possible to easily form the connection release means.

Further, the connection release means may be configured as a through hole provided in a lamp upper stay that connects between the upper portion of the lamp and the vehicle body.

In this configuration, the through hole functions as the weak portion, and therefore it is possible to easily form the connection release means.

Further, the connection release means may be configured as a thin portion provided in a lamp upper stay that connects between the upper portion of the lamp and the vehicle body.

In this way, the thin portion functions as the weak portion, and therefore, it is possible to easily form the connection release means.

Further, the lower connection means may be provided with an insert portion that is provided at the lower portion of the lamp on the side opposite to the center of the vehicle with respect to the center of gravity of the lamp in the longitudinal direction of the vehicle, and that opens toward the center of the vehicle in the longitudinal direction of the vehicle. The lower connection means may be also provided with a lower lamp attachment member whose one end is inserted into the insert portion from the side closer to the center of the vehicle in the longitudinal direction thereof and the other end is fixed to a portion of the vehicle body that is lower than the lamp.

In this configuration, the one end of the lower lamp attachment member is inserted into the insert portion provided at the lower portion of the lamp from the side closer to the center of the vehicle in the longitudinal direction thereof, and the other end of the lower lamp attachment member is fixed to the portion of the vehicle body that is lower than the lamp. Therefore, the connection between the lamp and the lower lamp attachment member in the lower connection portion is maintained when the lamp is pivoted about the lower connection portion and displaced downward due to the impact load applied from above the vehicle. This makes it possible to keep the lamp supported by the lower lamp attachment member, whereby it is possible to receive a part of the impact load by the lamp.

Further, as described above, the one end of the lower lamp attachment member is inserted into the insert portion provided at the lower portion of the lamp from the side closer to the center of the vehicle in the longitudinal direction thereof. Therefore, when the impact load is applied in the longitudinal direction of the vehicle to the vehicle body to which the other end of the lower lamp attachment member is fixed, the lower lamp attachment member, as well as the vehicle body, is displaced toward the center of the vehicle. This detaches the one end of the lower lamp attachment member from the insert portion provided at the lower portion of the lamp. In this way, the connection between the lamp and the lower lamp attachment member is released, and therefore, it is possible to suppress transmission of the impact load from the vehicle body to the lamp through the lower lamp attachment member.

The insert portion may include an upper wall portion and a lower wall portion that are disposed apart from each other in a vertical direction of the vehicle, and a front wall portion that connects between the upper wall portion and the lower wall portion so that the insert portion has a U-shaped cross-section when viewed in the lateral direction of the vehicle.

In this configuration, it is possible to form the insert portion into which the one end of the lower lamp attachment member is inserted.

Further, the insert portion may include: an upper wall portion and a lower wall portion that are disposed apart from each other in a vertical direction of the vehicle; a front wall portion that connects between the upper wall portion and the lower wall portion; and side wall portions that are provided on both sides of the insert portion in the width direction of the vehicle so that only a side of the insert portion closest to the center of the vehicle opens toward the center of the vehicle.

In this configuration, it is possible to form the insert portion into which the one end of the lower lamp attachment member is inserted.

Further, the lower lamp attachment member may be made of metal.

In this configuration, because the lower lamp attachment member is made of metal, the lower lamp attachment member is deformed so as to continuously absorb the impact energy when the lamp is pivoted and displaced downward with respect to the vehicle due to the impact load applied from above the vehicle.

Further, the one end of the lower lamp attachment member may be formed in a hook nail shape.

In this configuration, because the one end of the lower lamp attachment member is formed in a hook nail shape, the one end of the lower lamp attachment member is not easily detached from the insert portion provided at the lower portion of the lamp when the lamp is pivoted and displaced downward due to the impact load applied from above the vehicle. This makes it possible to more effectively receive a part of the impact load by the lamp.

The other end of the lower lamp attachment member may be fixed to a bumper reinforcement on the side opposite to the center of the vehicle with respect to the one end in the longitudinal direction of the vehicle.

In this configuration, the other end of the lower lamp attachment member is fixed to the bumper reinforcement on the side opposite to the center of the vehicle with respect to the one end in the longitudinal direction of the vehicle. Therefore, the lower lamp attachment member is easily deformed about a center at the other end fixed to the bumper reinforcement when the lamp is pivoted and displaced downward due to the impact load applied from above the vehicle. This makes it possible to increase the stroke of displacement of the lamp.

Moreover, when the impact load is applied to the bumper reinforcement in the longitudinal direction of the vehicle, it is possible to promptly detach, in the lower connection portion of the lamp, the one end of the lower lamp attachment member from the insert portion provided at the lower portion of the lamp. As a result, it is possible further reduce the influence on the lamp.

As described above, in the lamp mounting structure according to the first aspect of the invention, it is possible to achieve an advantageous effect that it is possible to minimize the influence on the lamp exerted when the impact load is applied in a longitudinal direction of the vehicle while securing the performance of absorbing impact energy when an impact load is applied from above the vehicle.

Further, it is possible to achieve another advantageous effect that the lamp receives a part of the impact load when the impact load is applied from above the vehicle, and transmission of the impact load from the vehicle body to the lamp is suppressed when the impact load is applied in the longitudinal direction of the vehicle.

Further, it is possible to achieve yet another advantageous effect that the impact energy is continuously absorbed.

Further, it is possible to achieve yet another advantageous effect that the lamp receives a part of the impact load more effectively.

Further, it is possible to achieve yet another advantageous effect that the displacement stroke of the lamp in response to the impact load applied from above the vehicle is increased, and it is possible to further reduce the influence on the lamp exerted when the impact load is applied in the longitudinal direction of the vehicle.

A vehicle according to a second aspect of the invention includes a lamp that is mounted to the vehicle with the use of the lamp mounting structure according to the first aspect of the invention.

With the vehicle according to the second aspect of the invention, it is possible to achieve an advantageous effect that it is possible to minimize the influence on the lamp exerted when the impact load is applied in a longitudinal direction of the vehicle while securing the performance of absorbing impact energy when an impact load is applied from above the vehicle.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 8A is a partially enlarged cross-sectional view of FIG. 1 showing the configuration of the lower connection portion in a normal state;

FIG. 8B is a partially enlarged cross-sectional view of FIG. 6 showing the state where one end of the lower lamp attachment member is not detached from the insert portion even when the headlamp is pivoted and displaced;

FIG. 11A is a partially enlarged cross-sectional view of FIG. 1 showing the configuration of the lower connection portion in a normal state; and FIG. 11B is an enlarged cross-sectional view of FIG. 10 showing a state where the one end of the lower lamp attachment member is detached from the insert portion.

DETAILED DESCRIPTION OF EMBODIMENTS

Figure 1:
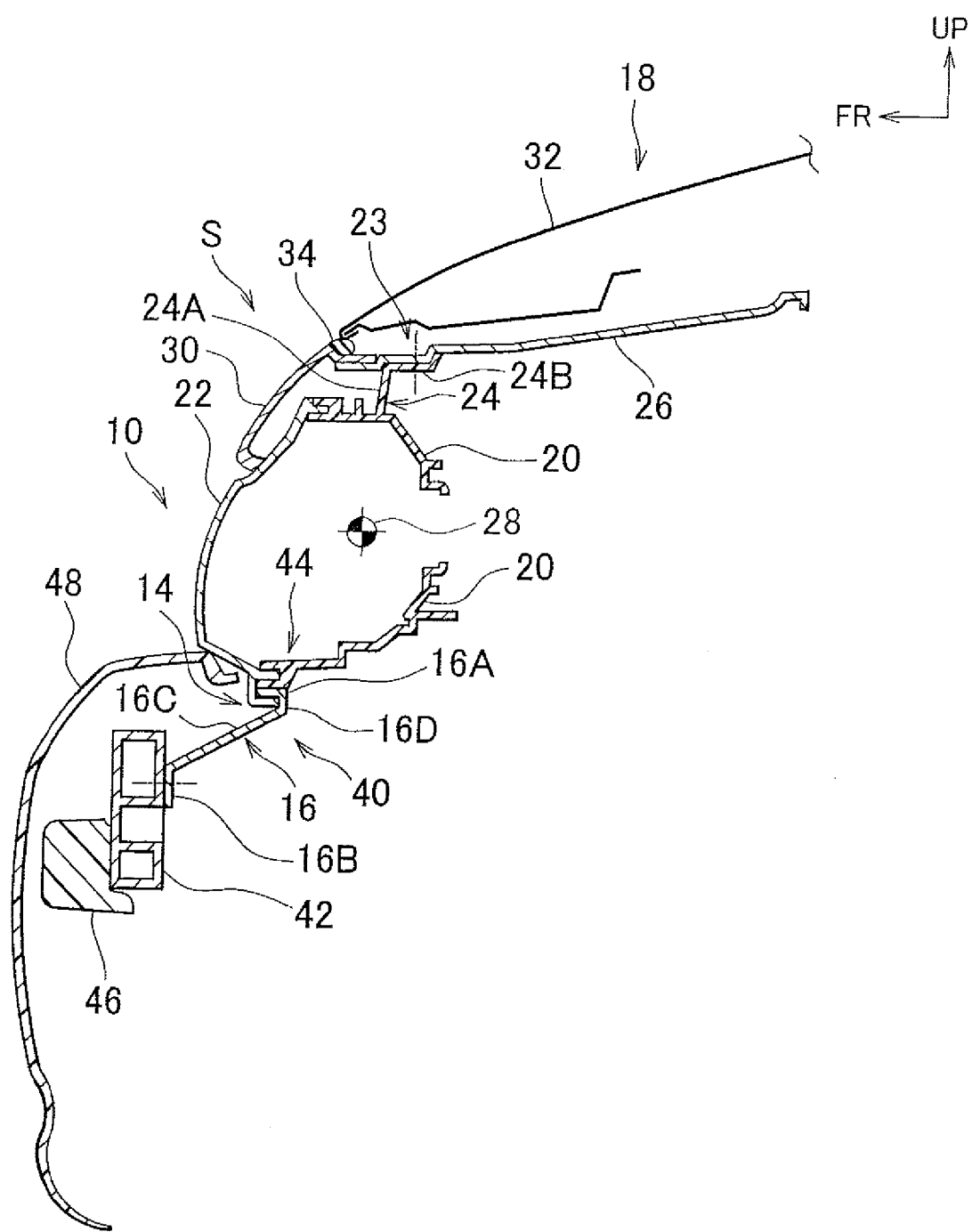
FIG. 1 is a cross-sectional view showing a lamp mounting structure.
Figure 2:
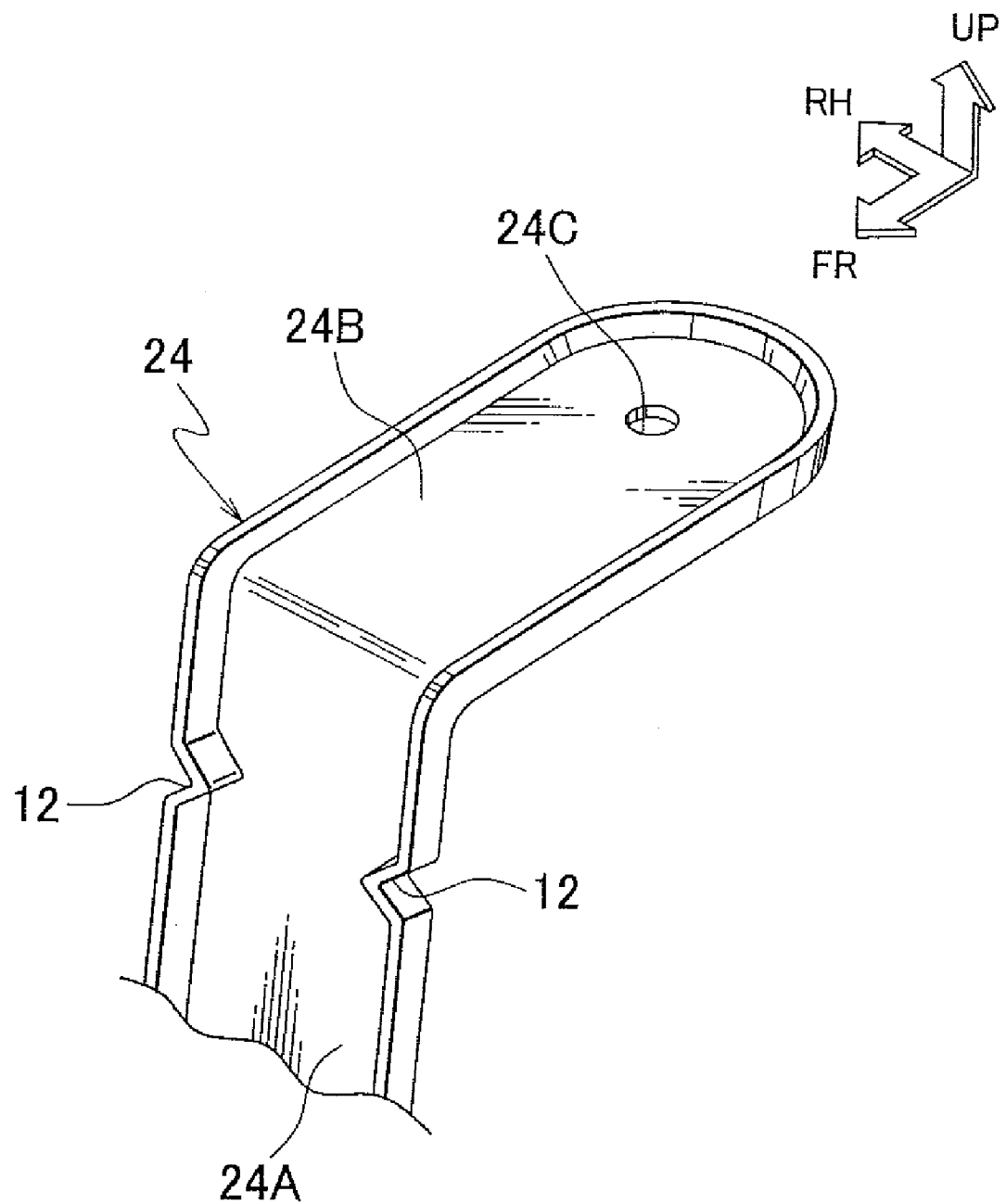
FIG. 2 is an enlarged perspective view showing a weak portion provided in a vertical wall portion of a lamp upper stay.

An embodiment of the invention will be hereinafter described with reference to the attached drawings. It should be noted that directional terms used in this specification, front and rear, for example, describe the directions with respect to a vehicle. In FIG. 1, a lamp mounting structure S according to the embodiment of the invention includes a headlamp 10 that is an example of a lamp, a weak portion 12 (as shown in FIG. 2) that is an example of a connection release means, and an insert portion 14 and a lower lamp attachment member 16 that function as a lower connection means.

The headlamp 10 is a headlight provided in an end portion of a vehicle 18 in a longitudinal direction thereof, and is configured in a manner such that, for example, a low-beam lamp, a high-beam lamp, and a position lamp (not shown) are integrated into a lamp main body 20, and a lens 22 is fitted to the lamp main body 20 from a front side of the vehicle 18.

Figure 7A:
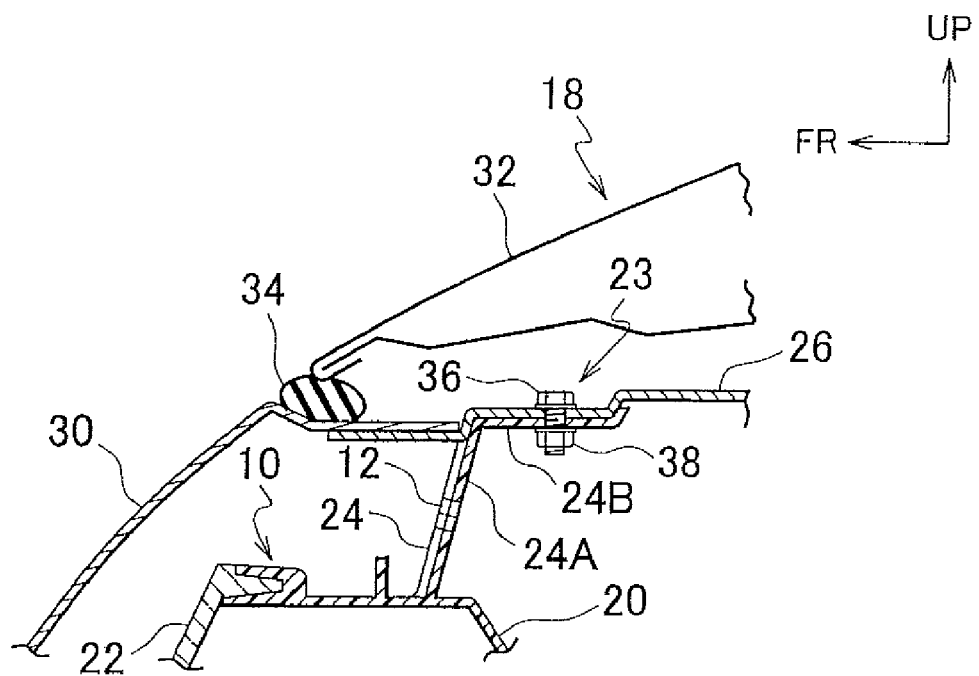
FIG. 7A is a partially enlarged cross-sectional view of FIG. 1 showing the configuration of the upper connection portion in a normal state.

The headlamp 10 is connected to a radiator support 26, which is an example of a vehicle body, in an upper connection portion 23. The upper connection portion 23 is provided, for example, rearward of a center of gravity 28 of the headlamp 10 (that is, on the side closer to the center of the vehicle 18 than the center of gravity 28). As shown in FIGS. 1 and 7A, in the upper connection portion 23, a lamp upper stay 24, which is provided above the lamp main body 20, is connected to the radiator support 26 by means of, for example, a bolt 36 and a nut 38.

In FIG. 7A, the lamp upper stay 24 includes, for example, a vertical wall portion 24A that extends upward from the upper portion of the lamp main body 20, and a horizontal wall portion 24B that extends rearward from an upper end portion of the vertical wall portion 24A along the radiator support 26 and that is fastened to a lower surface of the radiator support 26. As shown in FIG. 2, both of the vertical wall portion 24A and the horizontal wall portion 24B are configured to have U-shaped cross-sections, for example, in order to improve rigidity. Further, the horizontal wall portion 24B is provided with a through hole 24C through which the bolt 36 (shown in FIG. 7A) is inserted.

The weak portion 12 is provided in the upper connection portion 23, and functions to detach the headlamp 10 from the radiator support 26 in response to an impact load F1 (shown in FIG. 6) applied from above the vehicle 18. For example, the weak portion 12 is configured as a pair of notches that are provided in both sides, in a width direction of the vehicle 18, of the vertical wall portion 24A of the lamp upper stay 24, respectively. It should be noted that the configuration of the weak portion 12 is not limited to the notch-like configuration as shown in FIG. 2, and the weak portion 12 may be formed in a manner such that, for example, the thickness of the vertical wall portion 24A is partially reduced, or the vertical wall portion 24A is provided with a through hole. Further, the invention is not limited to the configuration in which the weak portion 12 is provided in the vertical wall portion 24A of the lamp upper stay 24, and the weak portion 12 may be provided in the horizontal wall portion 24B of the lamp upper stay 24.

A body front panel 30, which is shaped so as to overlap the lens 22, for example, is provided at a front end portion of the radiator support 26. Further, a front hood 32 that covers an engine compartment is provided above the radiator support 26. A weather strip 34 is provided between the front hood 32 and the body front panel 30.

In FIG. 1, the insert portion 14 and the lower lamp attachment member 16, which function as the lower connection means, are provided in a lower connection portion 40 in which a lower portion of the headlamp 10 is connected to a bumper reinforcement 42, which is an example of the vehicle body. It should be noted that the lower portion of the headlamp 10 is disposed forward of the center of gravity 28 of the headlamp 10 (that is, on the side opposite to the center of the vehicle 18 with respect to the center of gravity 28).

Figure 3:
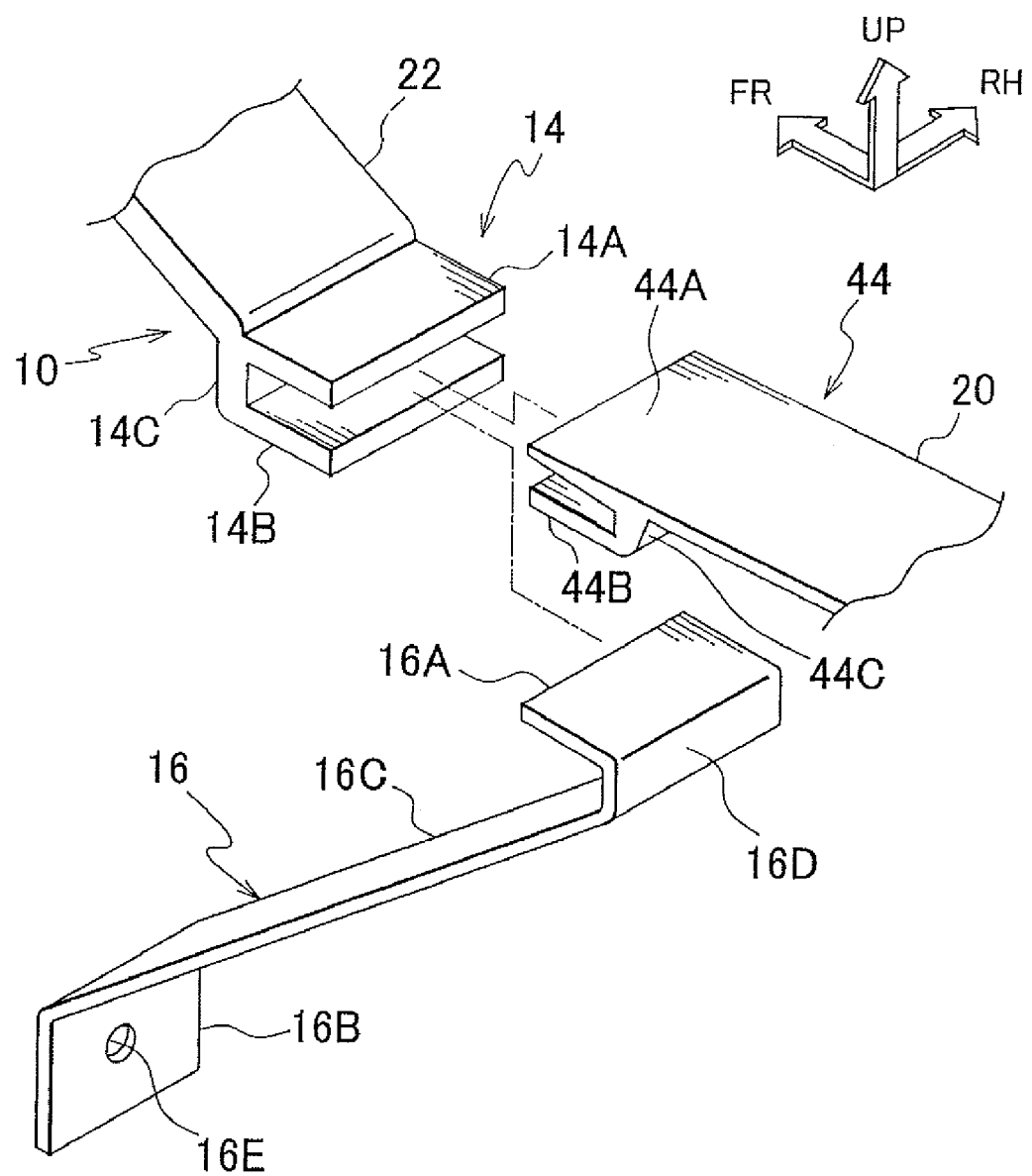
FIG. 3 is an exploded perspective view showing a lens and a lamp main body of a headlamp, an insert portion provided below the lens, and a lower lamp attachment member, which are connected in a lower connection portion.

As shown in FIG. 3, the insert portion 14 is provided at a lower portion of the lens 22, for example, that is positioned forward of the center of gravity 28 of the headlamp 10 in the longitudinal direction of the vehicle 18 (in other words, on the side opposite to the center of the vehicle 18 with respect to the center of gravity 28 in the longitudinal direction of the vehicle 18), and opens toward the rear of the vehicle 18 (that is, opens toward the center of the vehicle 18 in the longitudinal direction thereof). The insert portion 14 includes an upper wall portion 14A, a lower wall portion 14B, and a front wall portion 14C. The upper wall portion 14A is disposed apart from the lower wall portion 14B in a vertical direction of the vehicle 18, and the front wall portion 14C connects between the upper wall portion 14A and the lower wall portion 14B. In this way, the insert portion 14 is formed to have a U-shaped cross-section when viewed in the lateral direction of the vehicle 18. In the example shown in FIG. 3, the insert portion 14 opens, for example, on both sides in the width direction of the vehicle 18. However, the configuration of the insert portion 14 is not limited to this example, and may be configured so that side wall portions 14D are provided on both sides of the insert portion 14 in the width direction of the vehicle 18, respectively, and only a rear side of the insert portion 14 opens toward the rear of the vehicle 18, as shown in FIG. 4.

Figure 4:
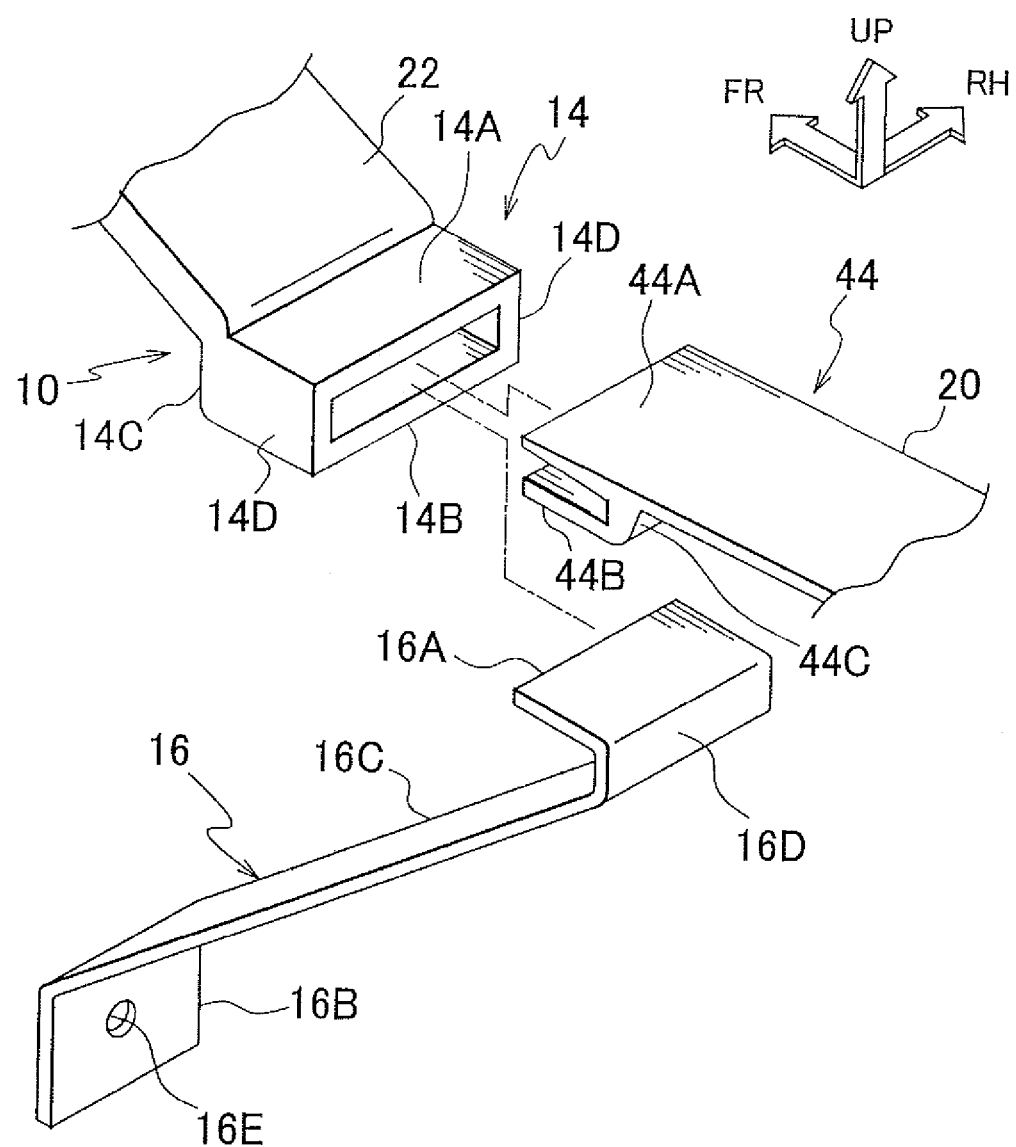
FIG. 4 is an exploded perspective view showing a modification example of the insert portion shown in FIG. 3.

As shown in FIGS. 3, 4, and 8A, an upper wall portion 44A, a lower wall portion 44B, and a rear wall portion 44C are provided in a lower front end portion of the lamp main body 20. The upper wall portion 44A is disposed apart from the lower wall portion 44B in the vertical direction of the vehicle 18, and the rear wall portion 44C connects between the upper wall portion 44A and the lower wall portion 44B in the vertical direction so as to form a U-sectioned insert portion 44 that opens toward the front of the vehicle 18 when viewed in the lateral direction of the vehicle 18. The insert portion 44 is engaged with the insert portion 14 provided in the lower end portion of the lens 22 in a manner such that the upper wall portion 14A of the insert portion 14 is interposed between the upper wall portion 44A and the lower wall portion 44B of the insert portion 44.

A one end 16A of the lower lamp attachment member 16 is interposed between the lower wall portion 44B of the insert portion 44 and the lower wall portion 14B of the insert portion 14. The lower lamp attachment member 16 is made of, for example, metal, and as shown in FIG. 1, the one end 16A is inserted into the insert portion 14 from behind (that is, from the side closer to the center of the vehicle 18 in the longitudinal direction thereof), and the other end 16B is fixed to the bumper reinforcement 42 disposed below the headlamp 10.

The one end 16A and the other end 16B of the lower lamp attachment member 16 are connected to each other by a body portion 16C that extends diagonally upward and rearward with respect to the vehicle 18. The one end 16A is provided at a rear end of the body portion 16C, and the other end 16B is provided at a front end of the body portion 16C.

Further, a rear wall portion 16D extends upward from the rear end of the body portion 16C, and the one end 16A, which is formed in a plate shape, protrudes forward from the upper end of the rear wall portion 16D. In this configuration, the one end 16A is formed in a hook nail shape by bending the rear end of the body portion 16C upward and forward.

The other end 16B of the lower lamp attachment member 16 is formed so as to extend along a rear surface of the bumper reinforcement 42. The other end 16B is provided with a through hole 16E through which a bolt (not shown) to fasten the lower lamp attachment member 16 to the bumper reinforcement 42 is inserted. Further, on the front side of the one end 16A (on the side opposite to the center of the vehicle 18 with respect to the one end 16A in the longitudinal direction of the vehicle 18), the other end 16B of the lower lamp attachment member 16 is fixed to the rear surface of the bumper reinforcement 42.

Figure 6:
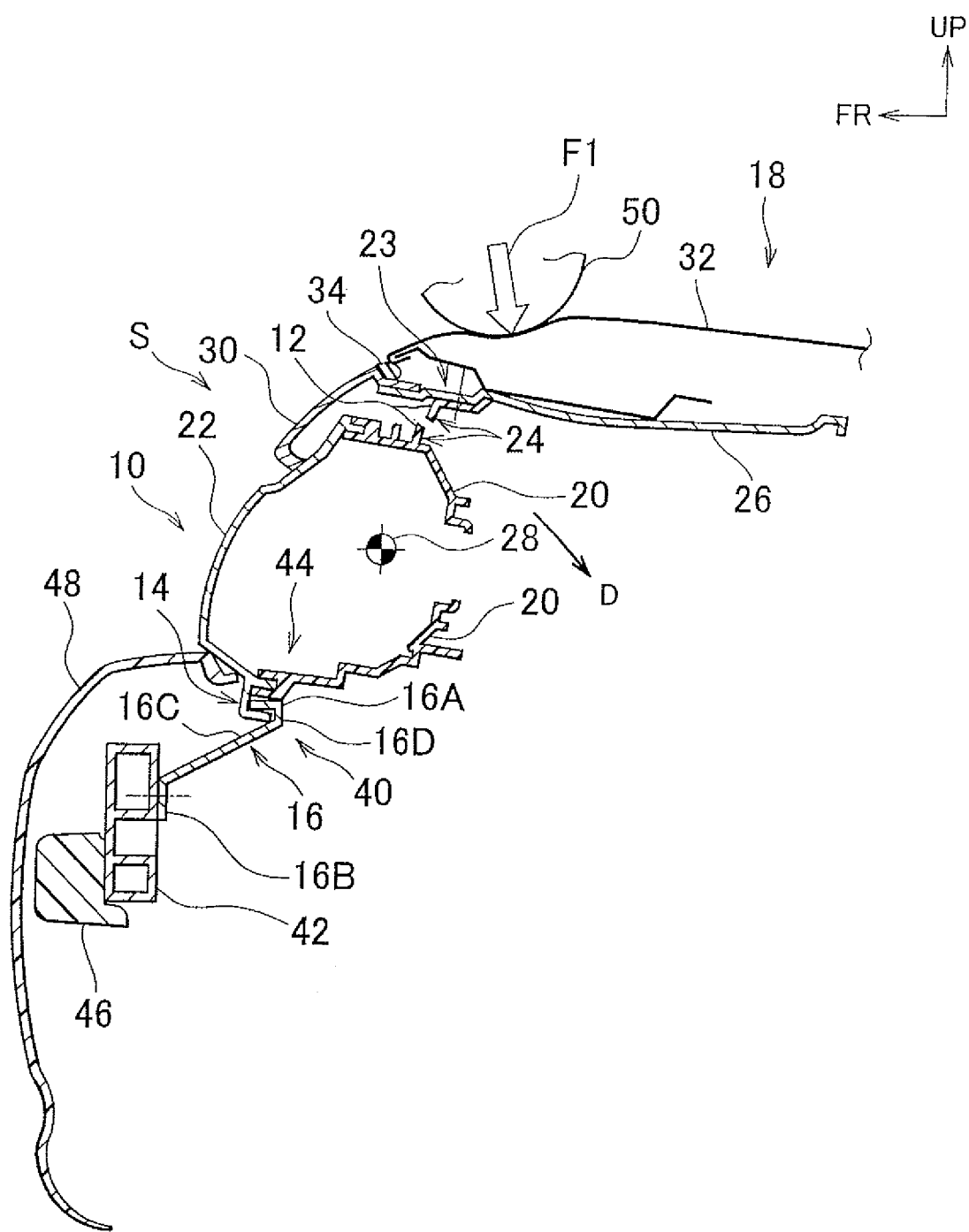
FIG. 6 is a cross-sectional view showing a state where the deformed lamp upper stay is broken at the weak portion, and the headlamp is pivoted about the lower connection portion and displaced downward with respect to the vehicle.
Figure 10:
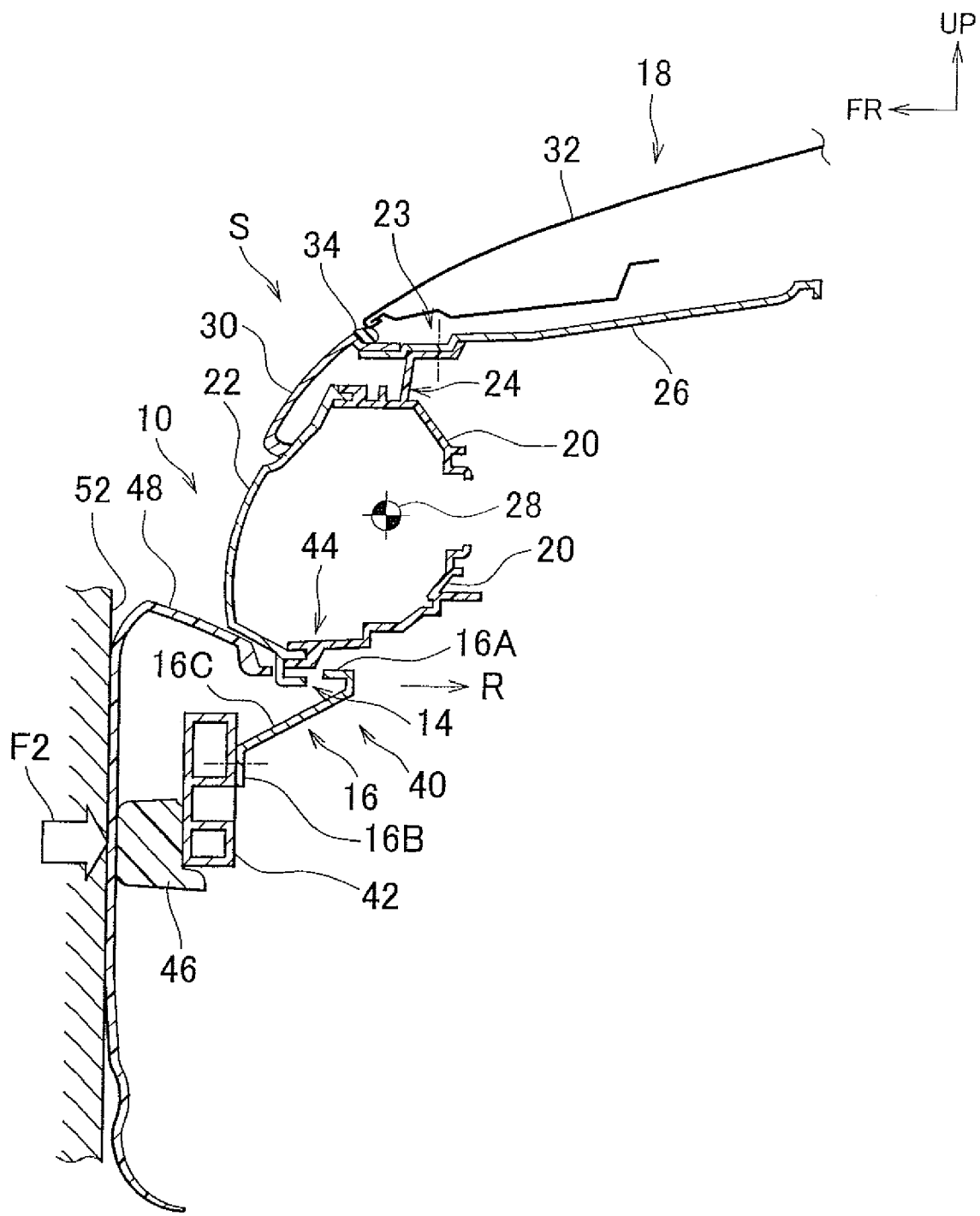
FIG. 10 is a cross-sectional view showing the state where the one end of the lower lamp attachment member is detached from the insert portion when the lower lamp attachment member, as well as a bumper reinforcement, is deformed rearward with respect to the vehicle (toward the center of the vehicle) due to the impact load applied from a front side of the vehicle (in a longitudinal direction of the vehicle) when another vehicle, etc. impacts the vehicle from front.

As shown in FIG. 6, the insert portion 14 and the lower lamp attachment member 16, which function as the lower connection means, are configured so that the connection between the headlamp 10 and the bumper reinforcement 42 is maintained when the impact load F1 is applied from above the vehicle 18. Further, as shown in FIG. 10, the insert portion 14 and the lower lamp attachment member 16 are configured so that the one end 16A of the lower lamp attachment member 16 is detached from the insert portion 14 so as to release the connection between the headlamp 10 and the bumper reinforcement 42 when an impact load F2 is applied from the front side of the vehicle 18 (in the longitudinal direction of the vehicle 18).

As shown in FIG. 1, a shock-absorbing member 46 is attached on a lower front surface of the bumper reinforcement 42. The shock-absorbing member 46 is made of, for example, polyurethane resin. Further, a bumper cover 48 is attached to the vehicle body so as to cover the lower portion of the lens 22 of the headlamp 10, the bumper reinforcement 42, and the shock-absorbing member 46, etc.

It should be noted that the lower lamp attachment member 16 may be formed by bending a metal plate, or may be formed by means of casting or forging.

Figure 5:
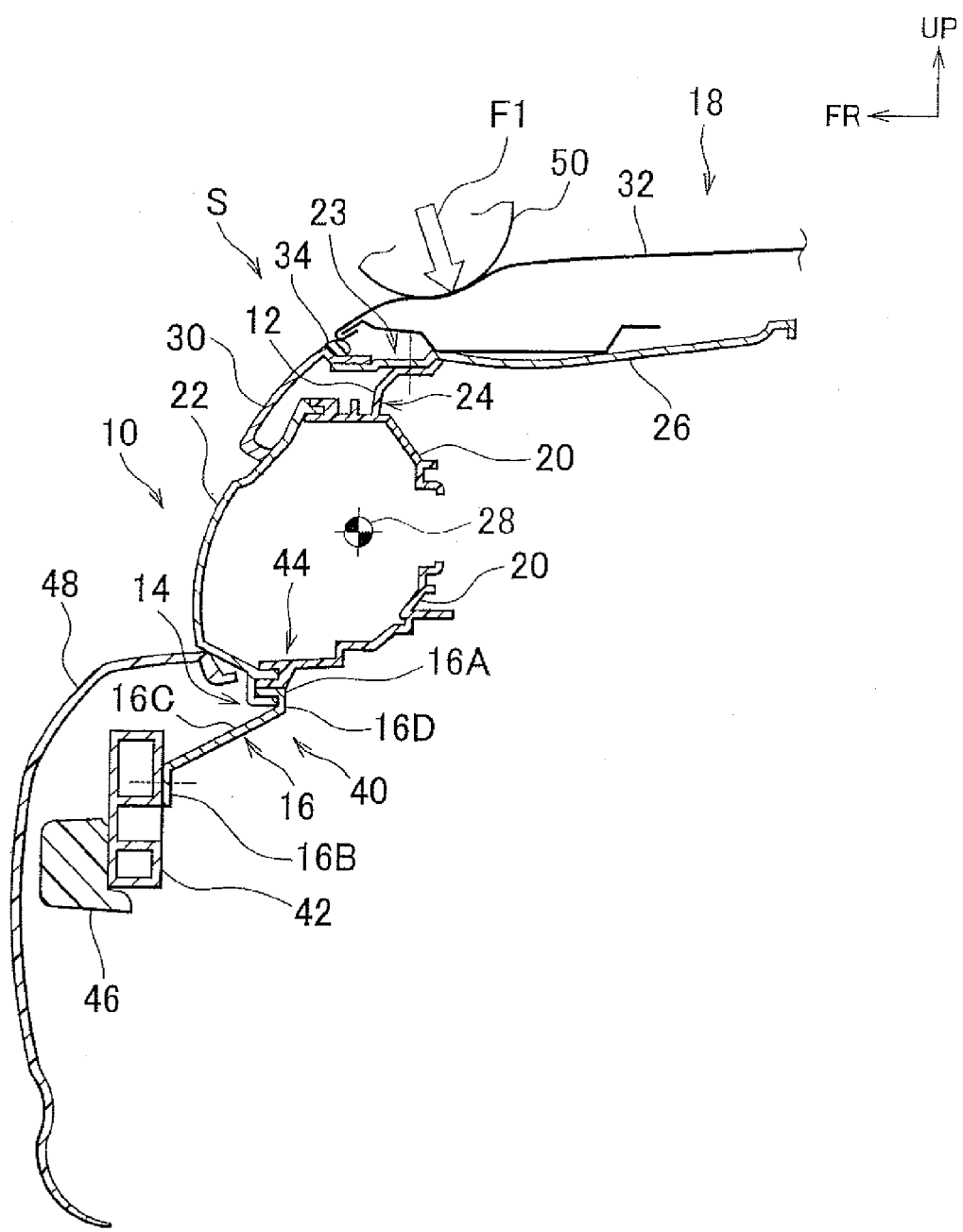
FIG. 5 is a cross-sectional view showing a state where the lamp upper stay in an upper connection portion is bent at the weak portion when an impact object impacts a front hood and an impact load is applied from above a vehicle.

According to the embodiment, the lamp mounting structure S is configured as described above. Next, the advantageous effects of the configuration according to the embodiment will be described. FIG. 5 shows that, in the lamp mounting structure S according to the embodiment, when an impact object 50 impacts the front hood 32 disposed above the headlamp 10, and the impact load F1 is applied to the front hood 32 from above, for example, the front hood 32 is deformed and brought into contact with the radiator support 26, and thus the impact load F1 applied to the front hood 32 from above is transmitted to the upper connection portion 23 in which the radiator support 26 and the headlamp 10 are connected.

Figure 7B:
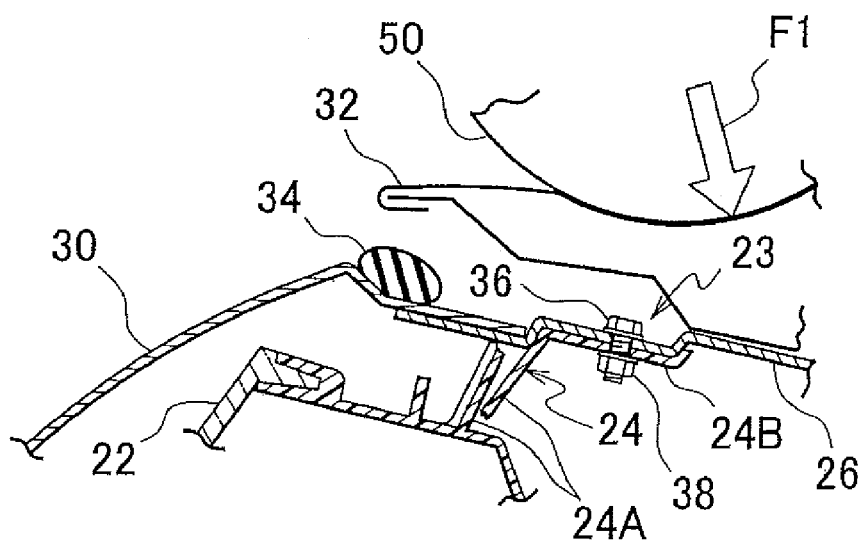
FIG. 7B is a partially enlarged cross-sectional view of FIG. 6 showing the state where the deformed lamp upper stay is broken at the weak portion.

As shown in FIGS. 2 and 7A, the weak portion 12 is provided in the vertical wall portion 24A of the lamp upper stay 24 in the upper connection portion 23. Therefore, as shown in FIG. 7B, when the impact load F1 is applied to the front hood 32 from above, the vertical wall portion 24A of the lamp upper stay 24 is bent and broken at the weak portion 12, and the upper portion of the headlamp 10 is detached from the radiator support 26, as shown in FIG. 6. The center of gravity 28 of the headlamp 10 is positioned rearward of the lower connection portion 40 (that is, on the side closer to the center of the vehicle 18 than the lower connection portion 40 in the longitudinal direction of the vehicle 18). Therefore, when the upper portion of the headlamp 10 is detached from the radiator support 26, the headlamp 10 is pivoted about the lower connection portion 40 and displaced downward in the direction indicated by the arrow D in FIG. 6 due to the weight of the headlamp 10 and the impact load F1 applied from above. When the headlamp 10 is pivoted and displaced in this way, stroke of deformation of the front hood 32 is increased, so that it is possible to secure the performance of absorbing impact energy.

On the other hand, as shown in FIG. 8A, the lower connection portion 40 in which the lower portion of the headlamp 10 is connected to the bumper reinforcement 42 includes the insert portion 14 and the lower lamp attachment member 16 that together function as the lower connection means for maintaining the connection between the headlamp 10 and the bumper reinforcement 42 (FIG. 6). In this configuration, even when the impact load F1 is applied from above the vehicle 18, the connection between the insert portion 14 and the lower lamp attachment member 16 is maintained, and therefore, the connection between the lower portion of the headlamp 10 and the bumper reinforcement 42 is maintained.

More specifically, as shown in FIG. 8B, the one end 16A of the lower lamp attachment member 16 is inserted into the insert portion 14 provided at the lower portion of the headlamp 10 from behind (that is, from the side closer to the center of the vehicle 18 in the longitudinal direction thereof), and the other end 16B of the lower lamp attachment member 16 is fixed to the bumper reinforcement 42 disposed below the headlamp 10. Therefore, as described above, even when the headlamp 10 is pivoted about the lower connection portion 40 and displaced downward in the direction as indicated by the arrow D, the one end 16A of the lower lamp attachment member 16 interferes with, for example, the lower wall portion 14B of the insert portion 14 on the lens 22 side and the lower wall portion 44B of the insert portion 44 on the lamp main body 20 side, and therefore, the one end 16A of the lower lamp attachment member 16 is not easily detached from the insert portion 14.

In other words, because the one end 16A of the lower lamp attachment member 16 is formed in a hook nail shape, the one end 16A of the lower lamp attachment member 16 is not easily detached from the insert portion 14 provided at the lower portion of the headlamp 10 when the headlamp 10 is pivoted and displaced downward due to the impact load F1 applied from above the vehicle 18. This makes it possible to keep the headlamp 10 supported by the bumper reinforcement 42 and the lower lamp attachment member 16, whereby it is possible to more effectively receive a part of the impact load F1 by the headlamp 10.

Figure 9:
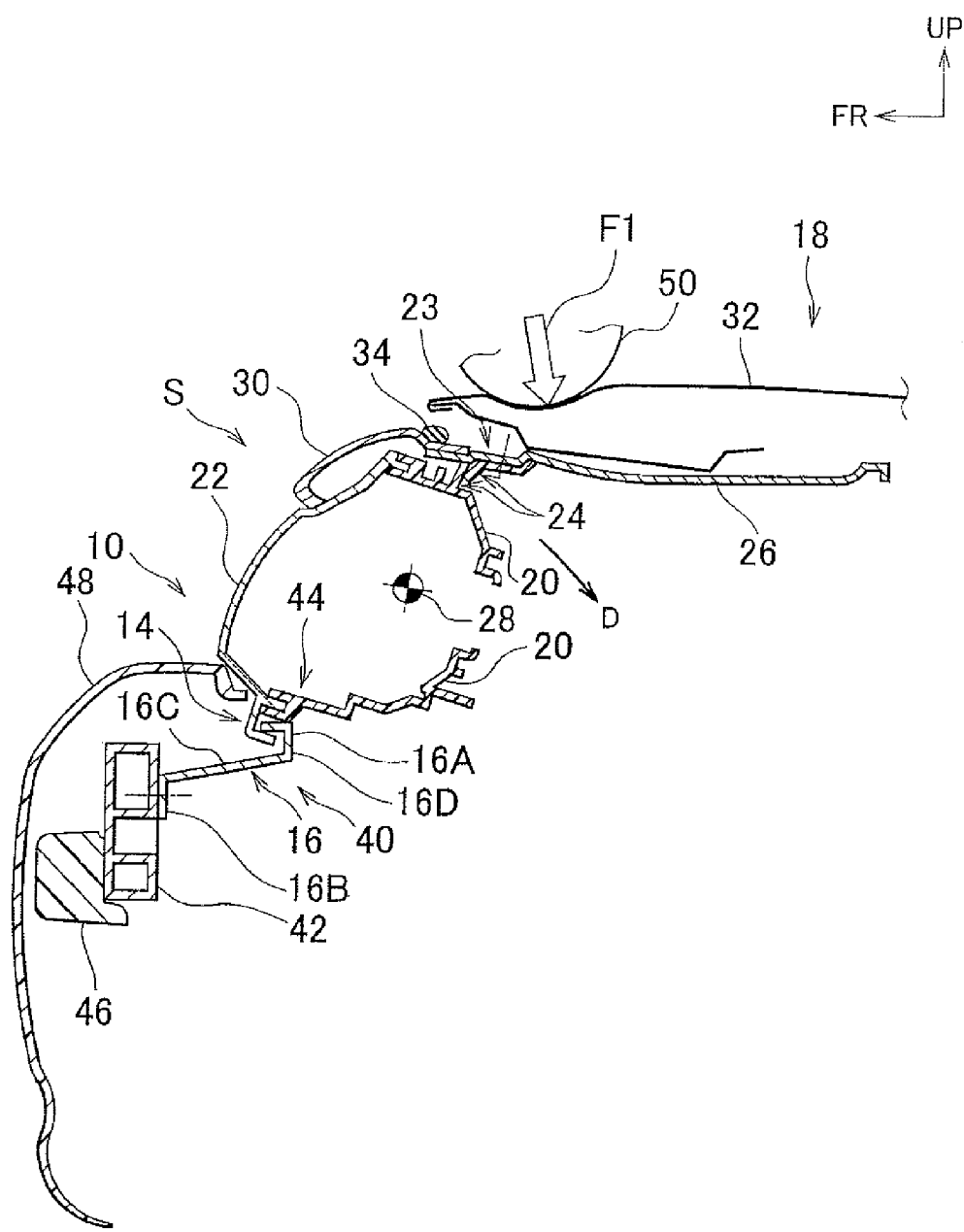
FIG. 9 is a cross-sectional view showing the state where the lower lamp attachment member is deformed in response to an impact load applied from above the vehicle so as to continuously absorb impact energy.

The lower lamp attachment member 16 is made of, for example, metal. Therefore, as shown in FIG. 9, when the headlamp 10 is pivoted and displaced downward due to the impact load F1 applied from above the vehicle 18, the lower lamp attachment member 16 is deformed so as to continuously absorb the impact energy. In other words, because relatively large load is required to largely deform the lower lamp attachment member 16 that is made of metal, it is possible to continuously absorb the impact energy.

According to the embodiment, the lower connection portion 40 is disposed forward of the center of gravity 28 of the headlamp 10 (that is, on the side opposite to the center of the vehicle 18 with respect to the center of gravity 28 in the longitudinal direction of the vehicle 18), and further, the other end 16B of the lower lamp attachment member 16 is fixed to the bumper reinforcement 42, on the front side of the one end 16A positioned in the lower connection portion 40 (that is, on the side opposite to the center of the vehicle 18 with respect to the one end 16A in the longitudinal direction of the vehicle 18). Therefore, a moment that acts on the lower connection portion 40 is increased when the headlamp 10 is pivoted and displaced downward due to the impact load F1 applied from above the vehicle 18. In this configuration, it is possible to easily deform the lower lamp attachment member 16 that is made of metal. As a result, it is possible to increase the displacement stroke of the headlamp 10, and further, it is possible to increase the deformation stroke of the front hood 32.

Next, the action when another vehicle 52, etc. collides with the vehicle 18 at the front will be described with reference to FIG. 10. If such a frontal impact occurs, the impact load F2 is applied to the bumper reinforcement 42 from the front side of the vehicle 18 (in the longitudinal direction of the vehicle 18) through the bumper cover 48 and the shock-absorbing member 46.

As shown in FIG. 11A, in the lower connection portion 40, the one end 16A of the lower lamp attachment member 16 is inserted into the insert portion 14 provided at the lower portion of the headlamp 10 from behind (from the side closer to the center of the vehicle 18 in the longitudinal direction thereof), and the other end 16B of the lower lamp attachment member 16 is fixed to the rear surface of the bumper reinforcement 42. Therefore, as shown in FIG. 10, when the impact load F2 is applied to the bumper reinforcement 42 from the front side of the vehicle 18 (in the longitudinal direction of the vehicle 18), the lower lamp attachment member 16, as well as the bumper reinforcement 42, is displaced rearward (toward the center of the vehicle 18).

Then, as shown in FIG. 11B, the one end 16A of the lower lamp attachment member 16 is detached from the insert portion 14 provided at the lower portion of the headlamp 10 in the direction indicated by the arrow R in FIG. 11B. This releases the connection between the headlamp 10 and the lower lamp attachment member 16 in the lower connection portion 40, whereby it is possible to suppress transmission of the impact load F2, which is applied from the front side of the vehicle 18 (in the longitudinal direction of the vehicle 18), from the bumper reinforcement 42 to the headlamp 10 through the lower lamp attachment member 16. In other words, according to the embodiment, it is possible to minimize the influence on the headlamp 10 exerted when the impact load F2 is applied from the front side of the vehicle 18 (in the longitudinal direction of the vehicle 18).

In addition, according to the embodiment, the other end 16B of the lower lamp attachment member 16 is fixed to the bumper reinforcement 42, on the front side of the one end 16A (that is, on the side opposite to the center of the vehicle 18 in the longitudinal direction thereof). Therefore, when the impact load F2 is applied to the bumper reinforcement 42 from the front side (in the longitudinal direction) of the vehicle 18, it is possible to promptly detach the one end 16A of the lower lamp attachment member 16 from the insert portion 14 provided at the lower portion of the headlamp 10 in the lower connection portion 40 disposed below the headlamp 10. Thus, it is possible to further reduce the influence on the headlamp.

It should be noted that the height difference between the one end 16A and the other end 16B of the lower lamp attachment member 16 in the vertical direction of the vehicle 18 may be reduced. In this configuration, the moment produced due to the impact load F2 applied from the front side (in the longitudinal direction) of the vehicle 18 is reduced, and therefore it is possible to reduce the possibility that the one end 16A is jammed in the insert portion 14, and as a result, it is possible to more stably detach the one end 16A from the insert portion 14.

As described above, with the lamp mounting structure S according to the embodiment, it is possible to effectively absorb the impact energy produced when the impact load F1 is applied from above the vehicle 18, and at the same time, it is possible to minimize the influence on the headlamp 10 exerted when the impact load F2 is applied from the front side (in the longitudinal direction) of the vehicle 18.

According to the embodiment as described above, the headlamp 10 is described as an example of a lamp. However, the invention is not limited to this, and may be applied to, for example, a rear combination lamp. Further, in the embodiment as described above, the weak portion 12 is described as an example of the connection release means. However, the connection release means is not limited to this, and any means or configuration may be employed as the connection release means, as long as the headlamp 10 is detached from the vehicle body when the impact load F1 is applied from above the vehicle 18.

Further, the radiator support 26 is described as an example of a portion of the vehicle body to which the upper portion of the headlamp 10 is connected. However, the portion of the vehicle body is not limited to the radiator support 26, and may be any other portion of the vehicle body, as long as the portion is suitable for connecting the upper portion of the headlamp 10.

Further, the bumper reinforcement 42 is described as an example of a portion of the vehicle body to which the lower portion of the headlamp 10 is connected. However, the portion of the vehicle body is not limited to the bumper reinforcement 42. It is preferable that the lower portion of the headlamp 10 be connected to the portion of the vehicle body that is disposed forward of the insert portion 14 with respect to the vehicle 18, in order to promptly detach the one end 16A of the lower lamp attachment member 16 from the insert portion 14 in the lower connection portion 40. If the invention is applied to the rear combination lamp, the lower portion of the lamp may be connected to a rear bumper reinforcement (not shown).

Further, according to the embodiment as described above, the lower lamp attachment member 16 is made of metal. However, the material is not limited to metal, and the lower lamp attachment member 16 may be made of, for example, synthetic resin.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A lamp mounting structure for a vehicle, with the use of which a lamp is mounted to an end portion of a vehicle in a longitudinal direction thereof, the lamp mounting structure characterized by comprising:
   a connection release device that detaches the lamp from a vehicle body in response to an impact load applied from above the vehicle, the connection release device provided in an upper connection portion in which an upper portion of the lamp is connected to the vehicle body; and
   a lower connection device that maintains a connection between the lamp and the vehicle body when the impact load is applied from above the vehicle and that releases the connection between the lamp and the vehicle body in response to an impact load applied in the longitudinal direction of the vehicle, the lower connection device provided in a lower connection portion in which the vehicle body is connected to a lower portion of the lamp on a side opposite to a center of the vehicle with respect to a center of gravity of the lamp in the longitudinal direction of the vehicle,
   wherein the lower connection device is provided with an insert portion that is provided at the lower portion of the lamp on the side opposite to the center of the vehicle with respect to the center of gravity of the lamp in the longitudinal direction of the vehicle and opens toward the center of the vehicle in the longitudinal direction of the vehicle, and a lower lamp attachment member whose one end is inserted into the insert portion from a side closer to the center of the vehicle in the longitudinal direction of the vehicle and an opposite end is fixed to a portion of the vehicle body that is lower than the lamp,
   wherein the other end of the lower lamp attachment member is fixed to a bumper reinforcement on the side opposite to the center of the vehicle with respect to the one end in the longitudinal direction of the vehicle, and
   wherein the one end of the lower lamp attachment member is formed in a hook nail shape.

2. The lamp mounting structure according to claim 1, wherein the connection release device is configured as a pair of notches provided in both sides, in a width direction of the vehicle, of a lamp upper stay that connects between the upper portion of the lamp and the vehicle body.

3. The lamp mounting structure according to claim 1, wherein the connection release device is configured as a through hole provided in a lamp upper stay that connects between the upper portion of the lamp and the vehicle body.

4. The lamp mounting structure according to claim 1, wherein the connection release device is configured as a thin portion provided in a lamp upper stay that connects between the upper portion of the lamp and the vehicle body.

5. The lamp mounting structure according to claim 1, wherein the insert portion includes an upper wall portion and a lower wall portion that are disposed apart from each other in a vertical direction of the vehicle, and a front wall portion that connects between the upper wall portion and the lower wall portion so that the insert portion has a U-shaped cross-section when viewed in a lateral direction of the vehicle.

6. The lamp mounting structure according to claim 1, wherein
   the insert portion includes: an upper wall portion and a lower wall portion that are disposed apart from each other in a vertical direction of the vehicle; a front wall portion that connects between the upper wall portion and the lower wall portion; and side wall portions that are provided on both sides of the insert portion in the width direction of the vehicle so that only a side of the insert portion closest to the center of the vehicle opens toward the center of the vehicle.

7. The lamp mounting structure according to claim 1, wherein the lower lamp attachment portion is made of metal.

8. A vehicle wherein a lamp is mounted to a vehicle with the use of the lamp mounting structure according to claim 1.

* * * * *